(12) United States Patent  
Kimura et al.

(10) Patent No.: US 7,716,304 B2  
(45) Date of Patent: May 11, 2010

(54) ACCESS CONTROL SYSTEM, GATEWAY CARD, AND ACCESS CONTROL METHOD

(75) Inventors: Masatoshi Kimura, Kawasaki (JP); Yoshiya Yoshimoto, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1590 days.

(21) Appl. No.: 10/743,901

(22) Filed: Dec. 24, 2003

(65) Prior Publication Data

US 2004/0205146 A1 Oct. 14, 2004

(30) Foreign Application Priority Data

Feb. 6, 2003 (JP) ............................. 2003-029924

(51) Int. Cl.  
*G06F 15/16* (2006.01)

(52) U.S. Cl. .................. 709/219; 709/217; 709/218

(58) Field of Classification Search .......... 709/217–219  
See application file for complete search history.

(56) References Cited

U.S. PATENT DOCUMENTS

| | | | | |
|---|---|---|---|---|
| 6,122,713 | A * | 9/2000 | Huang et al. ................. 711/147 |
| 6,269,371 | B1 | 7/2001 | Ohnishi |
| 6,608,400 | B1 * | 8/2003 | Muehsam .................... 307/23 |
| 6,658,576 | B1 * | 12/2003 | Lee .............................. 713/320 |
| 6,681,244 | B1 * | 1/2004 | Cross et al. ................. 709/203 |
| 7,225,351 | B2 | 5/2007 | Kimura et al. |
| 2002/0156899 | A1 * | 10/2002 | Sekiguchi .................... 709/227 |
| 2003/0009537 | A1 * | 1/2003 | Wang .......................... 709/219 |
| 2003/0167375 | A1 * | 9/2003 | Morishita et al. ........... 711/112 |
| 2003/0226149 | A1 * | 12/2003 | Chun et al. ................... 725/78 |
| 2004/0205146 | A1 * | 10/2004 | Kimura et al. .............. 709/213 |
| 2004/0221103 | A1 * | 11/2004 | Morishita et al. ........... 711/112 |
| 2004/0257898 | A1 * | 12/2004 | Ozawa et al. ............... 365/213 |
| 2005/0160185 | A1 * | 7/2005 | Matsuura et al. .............. 710/1 |
| 2006/0031591 | A1 * | 2/2006 | Hollstrom et al. ........... 709/250 |
| 2006/0238335 | A1 * | 10/2006 | Karaoguz et al. ...... 340/539.14 |
| 2006/0259184 | A1 * | 11/2006 | Hayes et al. ................ 700/221 |

(Continued)

FOREIGN PATENT DOCUMENTS

EP 1 199 879 A2 4/2002

(Continued)

OTHER PUBLICATIONS

"Japanese Office Action", Partial English-language translation, mailed Jun. 16, 2009 from JP Patent Office for corresponding JP App. No. 2007-128647.

*Primary Examiner*—Nathan Flynn  
*Assistant Examiner*—Mohamed Wasel  
(74) *Attorney, Agent, or Firm*—Fujitsu Patent Center

(57) ABSTRACT

A switching section is provided between a personal computer, a gateway card, and a common HDD. A CPU controls the switching section so as to connect the personal computer and the common HDD when the personal computer is in a normal power mode. The CPU controls the switching section so as to connect the gateway card and the common HDD when the personal computer shifts to a power-saving mode. When the personal computer is in the normal power mode, a cache memory caches data communicated between the gateway card and the personal computer, and the data communication between the gateway card and the personal computer is executed in parallel with an access to the common HDD.

8 Claims, 9 Drawing Sheets

U.S. PATENT DOCUMENTS

2007/0192644 A1    8/2007    Kimura et al.

FOREIGN PATENT DOCUMENTS

| JP | 61-275945 A | 12/1986 |
| JP | 7-056694 A | 3/1995 |
| JP | 10-254636 A | 9/1998 |
| JP | 10-320259 A | 12/1998 |
| JP | 11-058412 A | 3/1999 |
| JP | 11-249967 A | 9/1999 |
| JP | 2000-267928 A | 9/2000 |
| JP | 2001-051890 A | 2/2001 |
| JP | 2002-366308 | 12/2002 |
| JP | 2004-159279 A | 6/2004 |
| WO | WO 99/42915 | 8/1999 |

\* cited by examiner

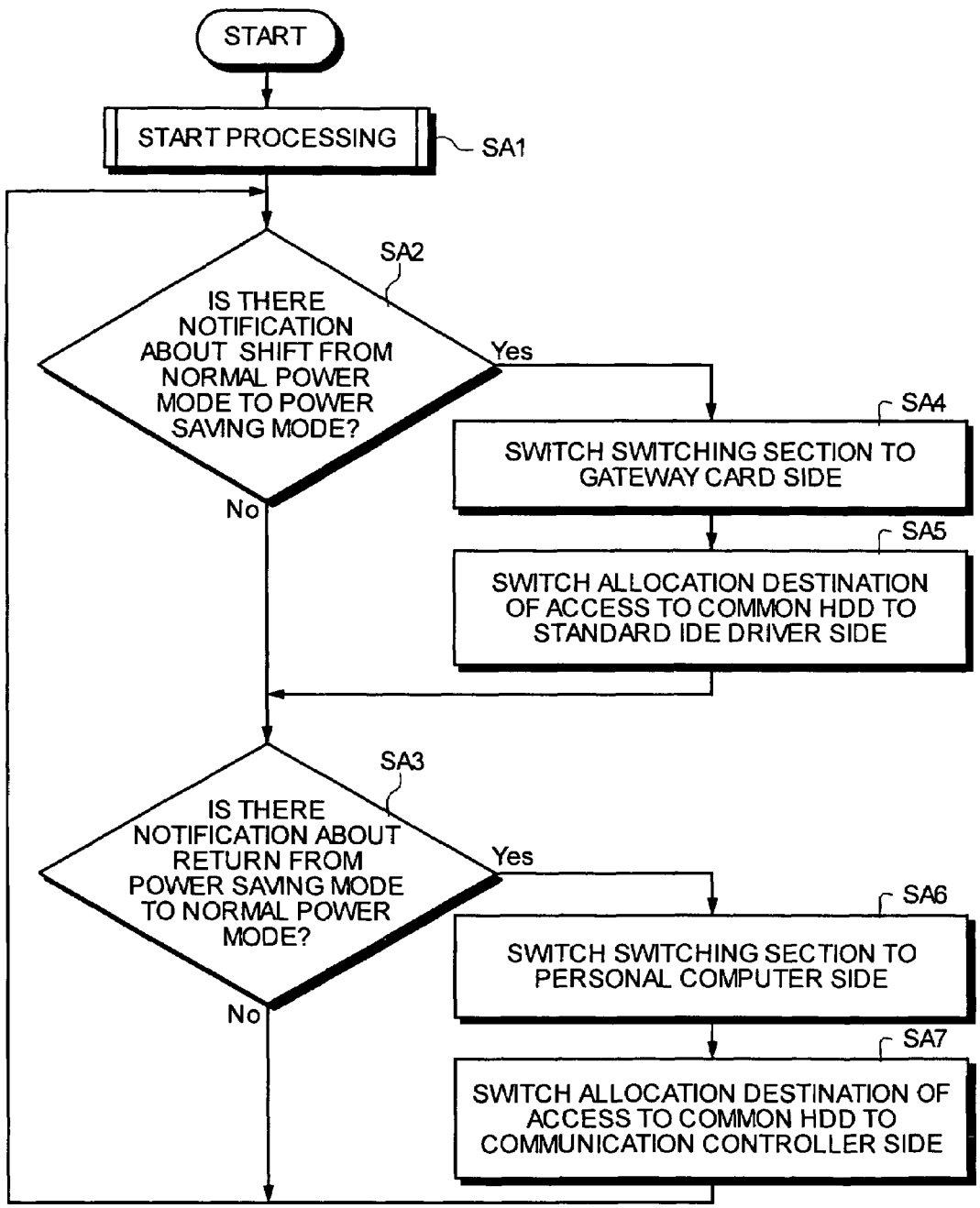

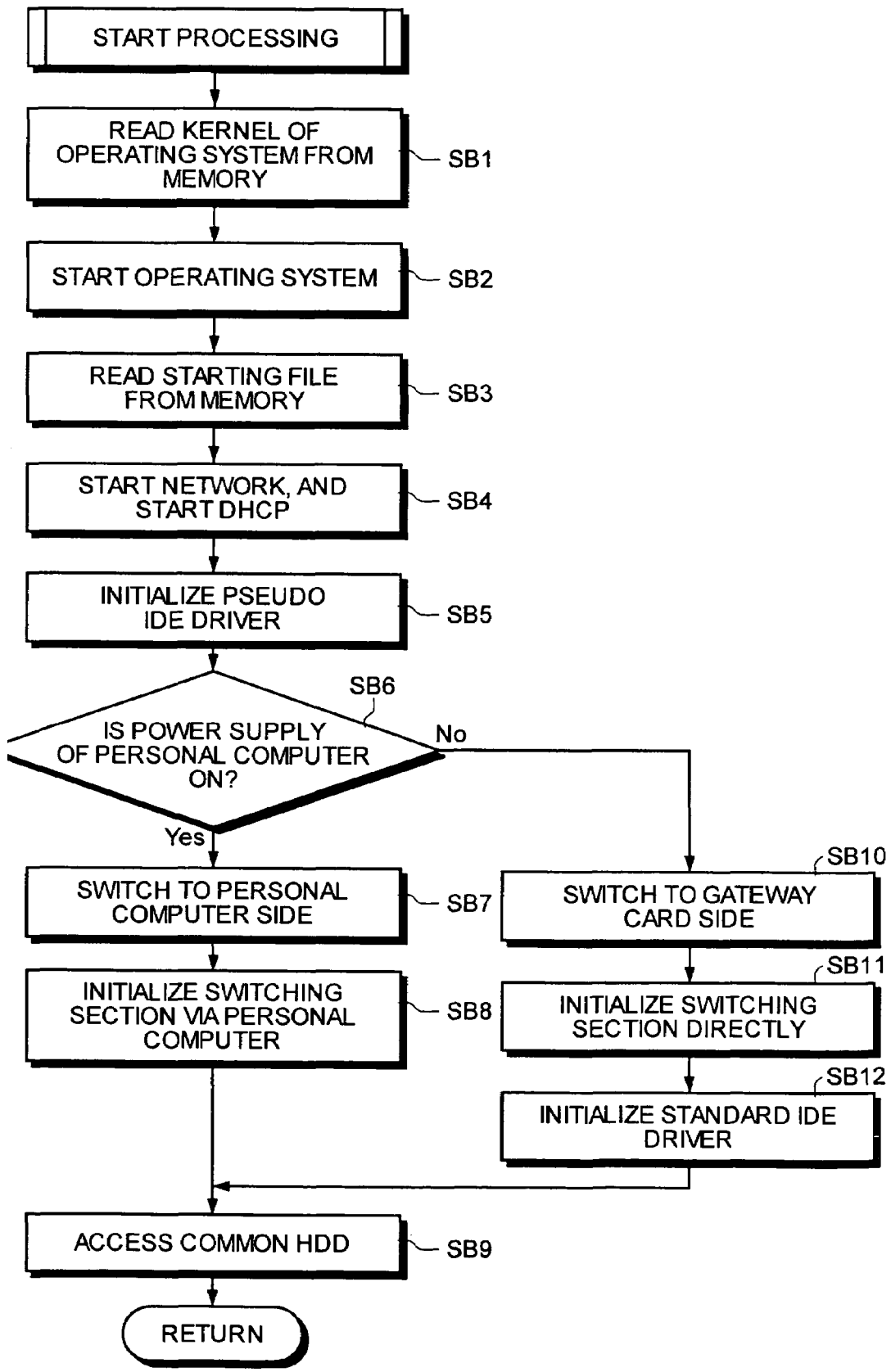

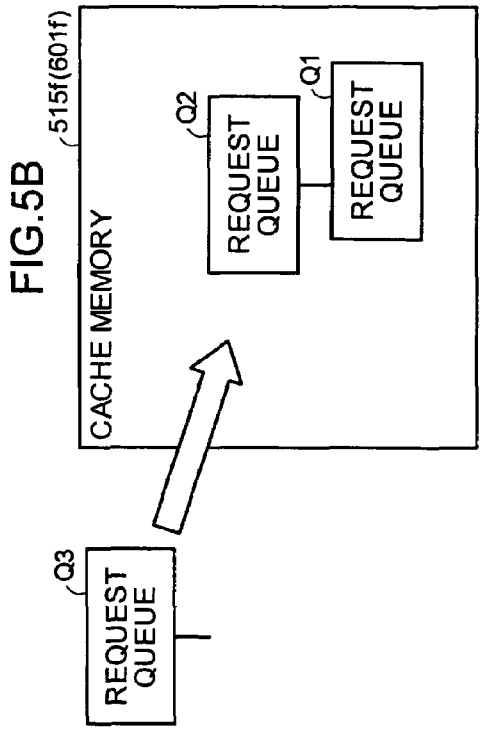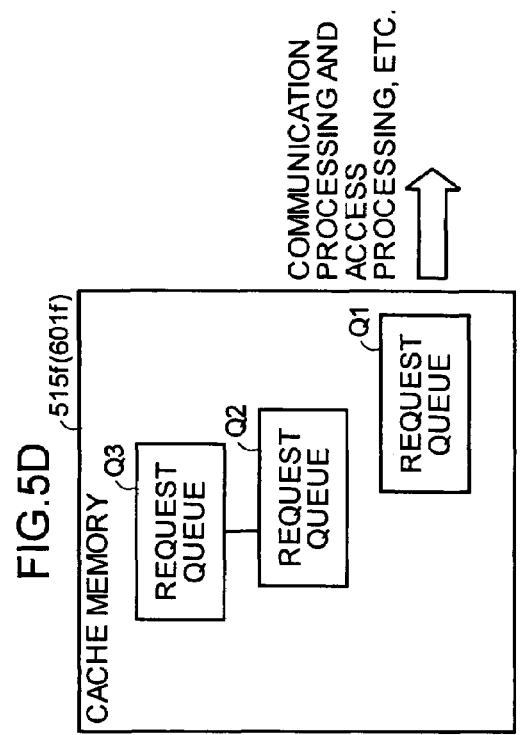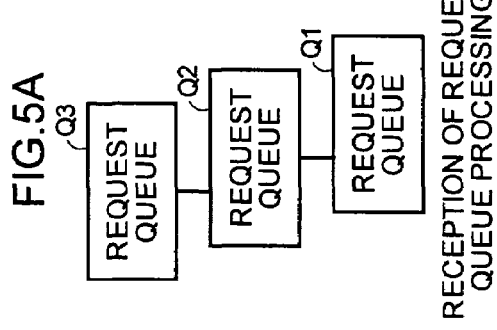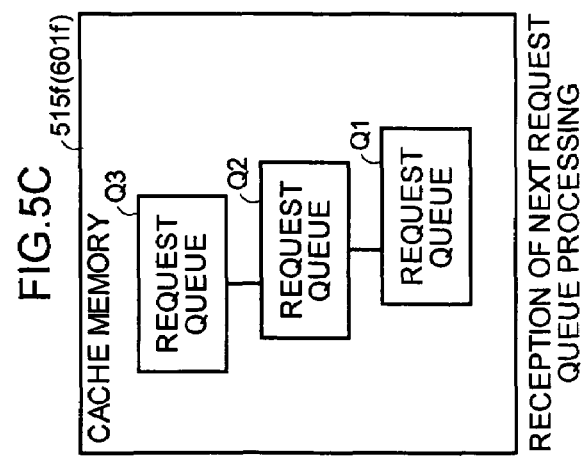

RECEPTION OF REQUEST QUEUE PROCESSING

COMMUNICATION PROCESSING AND ACCESS PROCESSING, ETC.

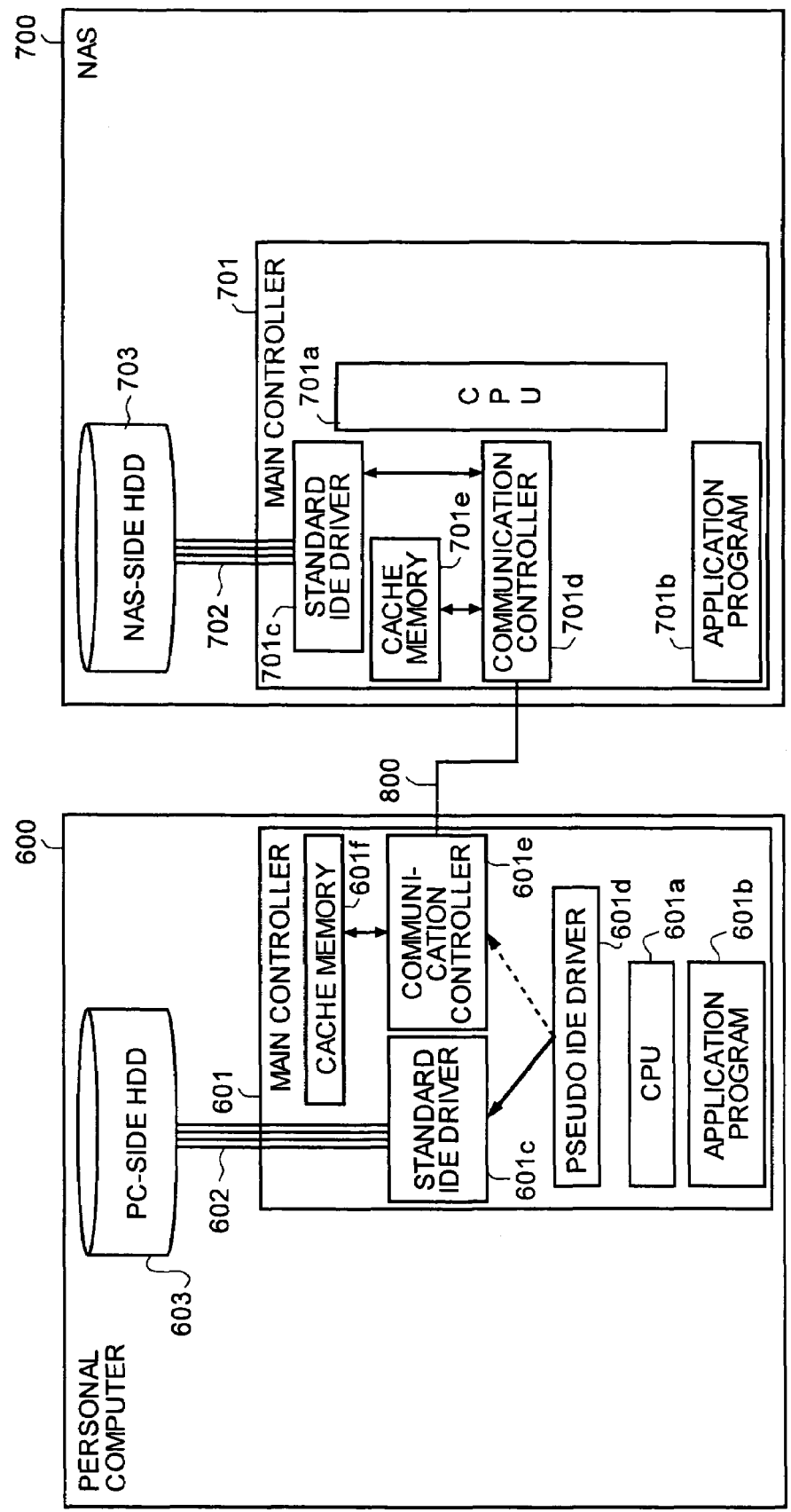

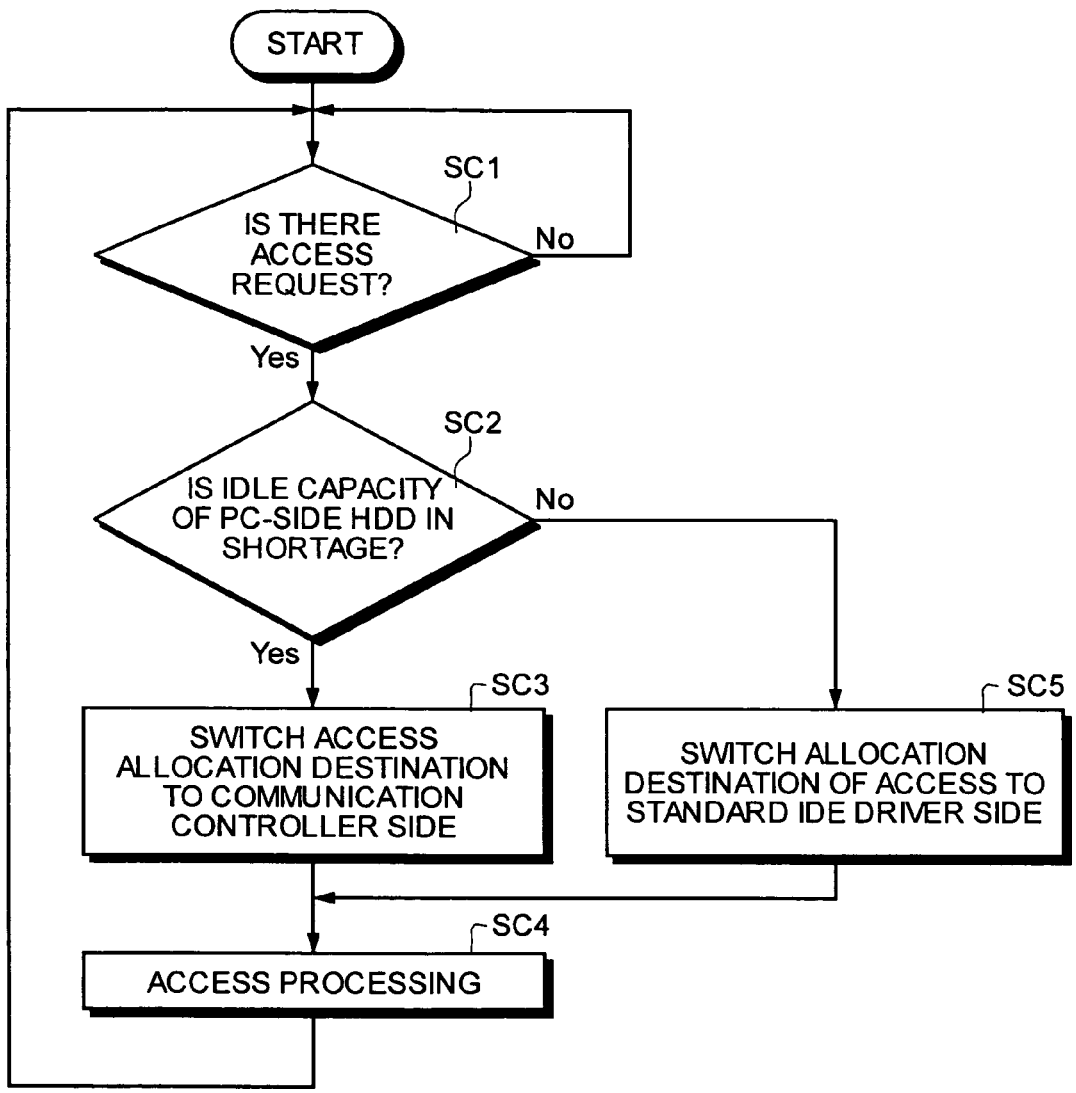

ACCESS CONTROL SYSTEM, GATEWAY CARD, AND ACCESS CONTROL METHOD

BACKGROUND OF THE INVENTION

1) Field of the Invention

The present invention relates to an information processing apparatus, an information processing system, a gateway card, a gateway device, and a computer program that are installed at home for adjusting communication protocols between different networks, capable of saving space, improving performance, and saving power.

2) Description of the Related Art

Recently, not only personal computers, but also home appliances such as the televisions and telephones, have been equipped with the Internet connection function that makes it possible to connect these home appliances to the Internet.

When a user purchases such an apparatus, it is required to do settings so that the apparatus can be connected to an access point of the Internet. These settings generally take lot of time and are tedious. Moreover, it is necessary to connect these apparatuses to telephone lines, to computers etc. These connections are generally complex and troublesome.

A gateway device called a home gateway or the like has attracted attention in recent years. What this device does is that it adjusts differences in communication protocols between the network at home and external networks including the Internet.

Precisely, all the devices in the home that have the Internet connection function are connected to this gateway device and the gateway device is connected to the public telephone line or other network. All the devices connected to the gateway device can be connected to the Internet so that tedious settings or complex wiring is not required.

A remote control system that remote controls home appliances such as a video recorder via the Internet and the gateway apparatus, has been proposed.

Japanese Patent Applications Laid-open Nos. H11-58412, H10-254636, H11-249967, H7-56694, H10-320259, 2000-267928, and S61-275945 disclose prior art.

SUMMARY OF THE INVENTION

It is an object of the present invention to solve at least the problems in the conventional technology.

An information processing apparatus according to one aspect of the present invention is connected to a data memory. The information processing apparatus includes a storage unit; an access control unit that allocates access between the storage unit and the data memory; and an information memory that stores information communicated between the access control unit and the data memory.

An information processing system according to another aspect of the present invention includes a data memory; and an information processing apparatus that is connected to the data memory. This information processing apparatus includes a storage unit; an access control unit that allocates access between the storage unit and the data memory; and an information memory that stores information communicated between the access control unit and the data memory.

A computer program according to still another aspect of the present invention is to be executed on an information processing apparatus that has a storage unit and that can access a data memory that is connected to the information processing apparatus via a communication unit. The computer program makes the information processing apparatus execute allocating an access between the storage unit and the data memory; and storing information communicated to the data memory while the data memory is being accessed.

A gateway card according to still another aspect of the present invention is connected to an information processor and allows transfer of data between different networks. The gateway card includes a switching unit that is provided between the information processor, the gateway card, and a memory; a switch control unit that controls the switching unit to connect between the information processor and the memory when the operation status of the information processor is a first operation status, and controls the switching unit to connect between the gateway card and the memory when the operation status of the information processor is shifted from the first operation status to a second operation status; an access control unit that controls an access to the memory, that allocates the access to the memory via the switching unit when the operation status of the information processor is the second operation status, and that allocates the access to the memory via the information processor and the switching unit when the operation status of the information processor is the first operation status; and an information storage unit that stores information communicated between the access control unit and the information processor.

A gateway device according to still another aspect of the present invention includes an information processor and a gateway card that is connected to the information processor and that allows transfer of data between different networks. The gateway card includes a switching unit that is provided between the information processor, the gateway card, and a memory; a switch control unit that controls the switching unit to connect between the information processor and the memory when the operation status of the information processor is a first operation status, and controls the switching unit to connect between the gateway card and the memory when the operation status of the information processor is shifted from the first operation status to a second operation status; an access control unit that controls an access to the memory, that allocates the access to the memory via the switching unit when the operation status of the information processor is the second operation status, and that allocates the access to the memory via the information processor and the switching unit when the operation status of the information processor is the first operation status; and an information storage unit that stores information communicated between the access control unit and the information processor. The information processor shifts the operation status from the first operation status to the second operation status when a predetermined cause of a shift occurs.

A computer program according to still another aspect of the present invention is a computer program to control a gateway card that is connected to an information processor and that allows transfer of data between different networks. This computer program makes a computer execute switching a switching unit, which is provided between the information processor, the gateway card, and a storage unit, to connect between the information processor and the memory when the operation status of the information processor is a first operation status, and switching the switching unit to connect between the gateway card and the memory when the operation status of the information processor is shifted from the first operation status to a second operation status; allocating an access to the memory via the switching unit when the operation status of the information processor is the second operation status, and allocating an access to the memory via the information processor and the switching unit when the operation status of the information processor is the first operation status; and storing information communicated to the information processor while the information processor is being accessed.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a flowchart to explain the operation performed by a main controller shown in FIG. 1;

FIG. 4 is a flowchart to explain the start processing shown in FIG. 3;

FIGS. 5A to 5D is to explain about an access processing according to the first embodiment and a second embodiment;

FIG. 7 is a block diagram of a computer system according to the second embodiment of the present invention;

FIG. 8 is a flowchart to explain the operation according to the second embodiment.

DETAILED DESCRIPTION

Exemplary embodiment of an information processing apparatus, an information processing system, a gateway card, a gateway device, and a computer program according to the present invention will be explained in detail with reference to the accompanying drawings.

Figure 1:
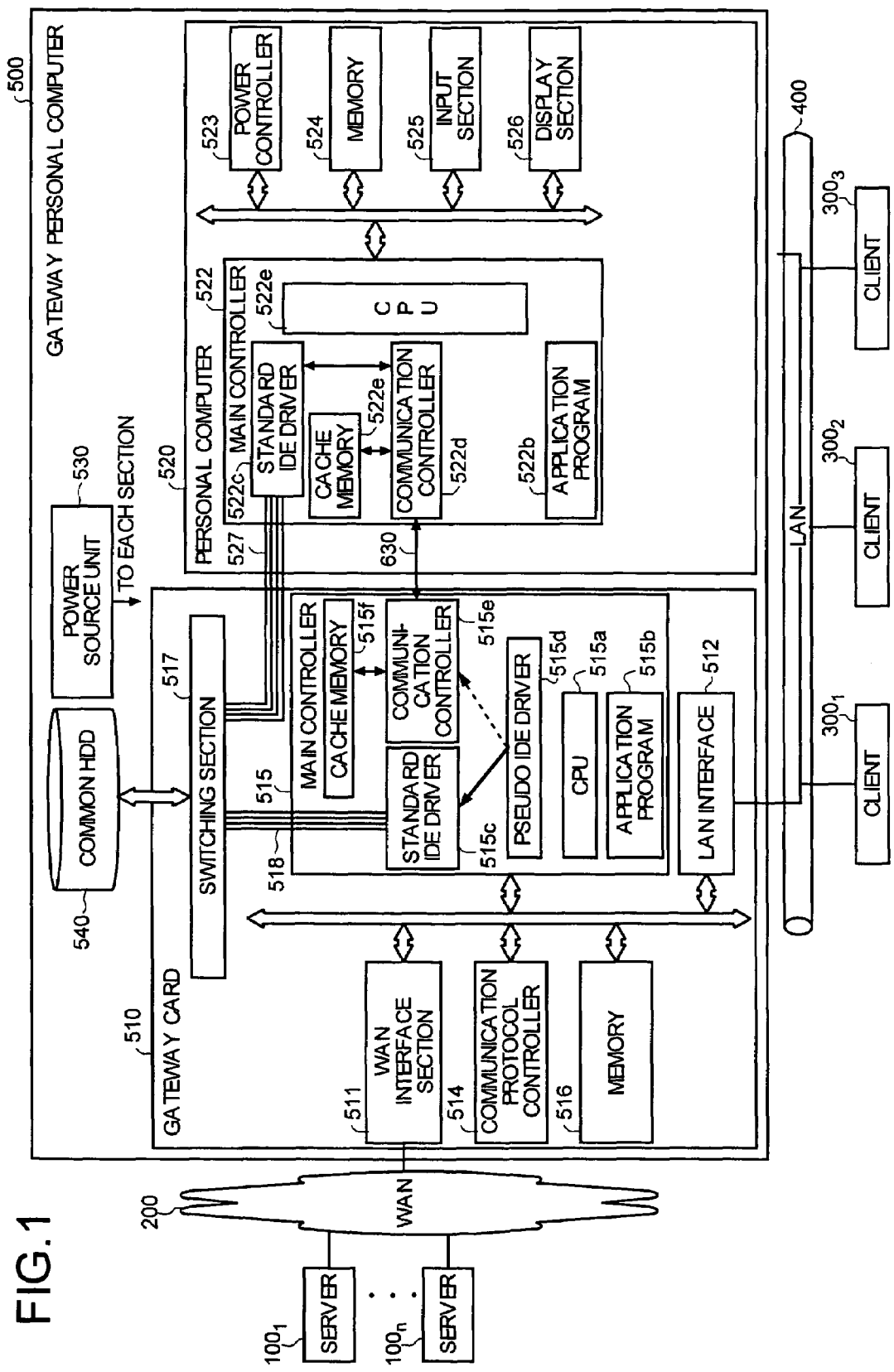
FIG. 1 is a block diagram of a communication system according to a first embodiment of the present invention.

FIG. 1 is a block diagram of a communication system according to a first embodiment of the present invention. In this communication system, a WAN (Wide Area Network) 200 and a LAN (Local Area Network) 400, having mutually different communication protocols and different standards, are connected to each other via a gateway personal computer 500.

The gateway personal computer 500 has a common HDD (Hard Disk Drive) 540 shared by a gateway card 510 and a personal computer 520 in order to save space.

The gateway personal computer 500 also has a cache memory 515$f$ and a cache memory 522$e$ in order to improve the performance when the gateway card 510 accesses the common HDD 540 via a LAN 630 described later.

The WAN 200 is a wide network such as the Internet, a public line network, a radio communication network, a CATV (CAble TeleVision) network, and the like. The WAN 200 interconnects remote computers to each other according to predetermined communication protocols. The WAN 200 will be explained by taking the Internet as an example.

Servers 1001 to 100$n$ are mail servers, WWW (World Wide Web) servers, and the like, and are connected to the WAN 200. The servers 1001 to 100$n$ provide clients 3001 to 3003 with mail services and WWW site services, and the like, via a gateway personal computer 500, and the LAN 400 described later.

The clients 3001 to 3003 are electric appliances (televisions, telephones, audio apparatuses) installed at home, for example, and having a personal computer and network connection function.

The clients 3001 to 3003 are connected to the LAN 400 laid down at home. The clients 3001 to 3003 have a function of receiving the various services by accessing the servers 1001 to 100$n$ via the LAN 400, the gateway card 510, and the WAN 200.

The clients 3001 to 3003 also have a function of receiving various kinds of data by accessing the personal computer 520 via the LAN 400 and the gateway card 510.

As explained above, the clients 3001 to 3003 access the servers 1001 to 100$n$ as external devices, and access the personal computer 520 as an internal device.

The WAN 200 and the LAN 400 employ mutually different communication protocols.

The gateway personal computer 500 is installed at home and is exclusively used to provide functions of a gateway (such as a router function and a bridge function), and is present between the WAN 200 and the LAN 400 that have mutually different communication protocols.

The gateway is a general term of hardware and software that make it possible to interconnect between the LAN 400 and the WAN 200 by adjusting a difference between the communication protocols of these networks.

The gateway personal computer 500 includes the gateway card 510, the personal computer 520, a power supply unit 530, and a common HDD 540.

The gateway card 510 is a card-type gateway device that can communicate with the personal computer 520 via the LAN 630, and provides the functions of the gateway.

The personal computer 520 has functions of a general personal computer. The power supply unit 530 supplies power to each section of the gateway card 510 and the personal computer 520.

The common HDD 540 is a large-capacity memory that is shared by the gateway card 510 and the personal computer 520. This common HDD 540 stores the operating systems and the application programs that are used in the gateway card 510 and the personal computer 520 respectively. A switching section 517 described later executes a switching of the common HDD 540.

In the gateway card 510, a WAN interface section 511 is connected to the WAN 200, and functions as a communication interface with the WAN 200. A LAN interface section 512 is connected to the LAN 400, and functions as a communication interface with the LAN 400.

A communication protocol controller 514 carries out a control (analysis of communication protocols) to adjust a difference between the communication protocols of the WAN 200 and the LAN 400, thereby to make the interconnection possible.

A main controller 515 controls switching of a switching section 517, controls communications with the personal computer 520, and controls access to the common HDD 540. In the main controller 515, a CPU (Central Processing Unit) 515$a$ controls switching and controls communications according to the execution of various computer programs (operating systems, a starting program, application programs, etc.)

An application program 515$b$ is a computer program that is executed by the CPU 515$a$, and that provides specific functions. A standard IDE driver 515$c$ is a driver for a hard disk interface installed as a standard on the gateway card 510. The standard IDE driver 515$c$ controls accesses to the common HDD 540 via an IDE bus 518 and the switching section 517.

A pseudo IDE driver 515$d$ has a driver function similar to the function of the standard IDE driver 515$c$, and a function of allocating access from the CPU 515a to the common HDD 540 to either the standard IDE driver 515c or a communication controller 515e.

Specifically, when the personal computer 520 is in the power-saving mode described later, the switching section 517 is switched to the gateway card 510. In this case, the pseudo IDE driver 515d allocates the access from the CPU 515a to the standard IDE driver 515c. The CPU 515a accesses the common HDD 540 via the pseudo IDE driver 515d, the standard IDE driver 515c, the IDE bus 518, and the switching section 517.

On the other hand, when the personal computer 520 is in the normal power mode described later, the switching section 517 is switched to the personal computer 520. In this case, the pseudo IDE driver 515d allocates the access from the CPU 515a to the communication controller 515e. The CPU 515a accesses the common HDD 540 via the LAN 630, a communication controller 522d, a standard IDE driver 522c, the IDE bus 527, and the switching section 517.

The communication controller 515e controls communications with the communication controller 522d via the LAN 630. The cache memory 515f is provided corresponding to the communication controller 522e. The cache memory 515f is a memory to buffer a request queue (a command and data) at the time of accessing the common HDD 540 via the LAN 630 and the personal computer 520.

A memory 516 stores a kernel of an operating system, a starting program, and system data. The operating system is a basic program that carries out a management of files, a management of memories, a management of an input and an output, and a provision of a user interface. The kernel is a computer program that achieves the basic functions of the operating system such as the memory management and the task management.

The starting program is a computer program to start the networks (the LAN 630 and the LAN 400), and a DHCP (Dynamic Host Configuration Protocol). The DHCP is a protocol to dynamically allocate an IP (Internet Protocol) address to a computer on the LAN.

When the gateway card 510 provides a function of a router, for example, the system data is an IP address, DHCP data, line data, filtering data, and firmware.

Figure 2:
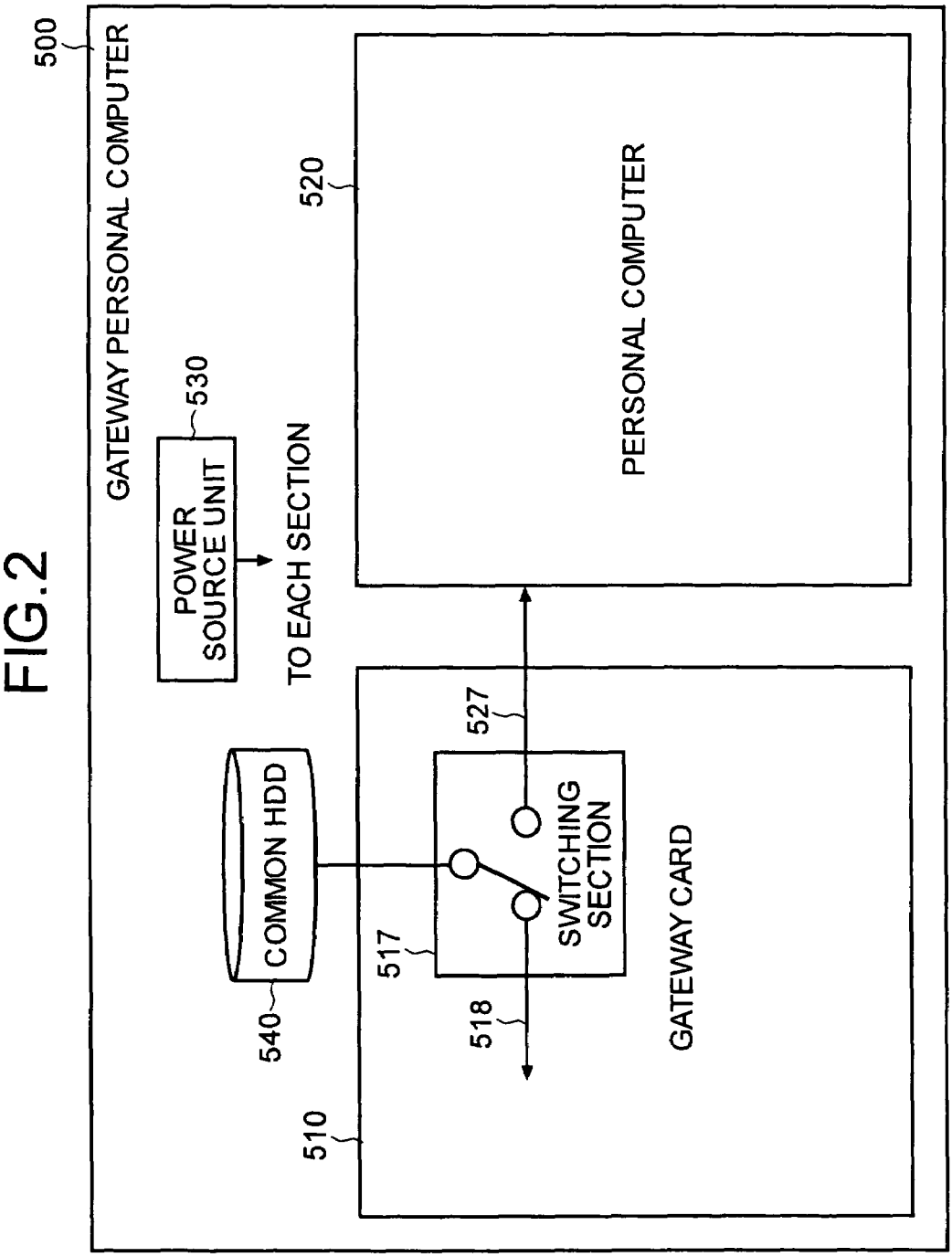
FIG. 2 is a block diagram of a switching section shown in FIG. 1.

The switching section 517 has a switch configuration as shown in FIG. 2, and has a function of switching the common HDD 540 to the gateway card 510 or the personal computer 520.

Specifically, the switching section 517 has a function of switching between the gateway card 510 and the personal computer 520 by switching over between an IDE (integrated device electronica) 518 bus and the IDE bus 527.

The IDE bus 518 is provided in the gateway card 510. On the other hand, the IDE bus 527 is provided in the personal computer 520.

When the switching section 517 is switched over to the gateway card 510, the common HDD 540 can access the gateway card 510.

On the other hand, when the switching section 517 is switched over to the personal computer 520, the common HDD 540 can access the personal computer 520. When the switching section 517 is switched over to the personal computer 520, the gateway card 510 can access the common HDD 540 via the personal computer 520 and the switching section 517.

Referring back to FIG. 1, in the personal computer 520, a power controller 523 controls power supply corresponding to the normal power mode or the power-saving mode at the time of supplying power from a power source unit 530 to each section of the personal computer 520.

The normal power mode is a power mode for supplying rated power to each section of the personal computer 520. The power-saving mode is a power mode for supplying power lower than the rated power to minimum necessary sections of the personal computer 520 thereby to lower power consumption.

The power-saving mode is classified into a standby mode and a suspension mode. Positions of storing work data are different between the standby mode and the suspension mode. In the standby mode, the work data is stored in the memory 524, and it is necessary to keep supplying power to the memory 524.

On the other hand, in the suspension mode, the common HDD 540 stores the work data, and power supply to this common HDD 540 is set off. Therefore, power consumption in the suspension mode is much smaller than that in the standby mode. It is assumed below that the power-saving mode is the standby mode or the suspension mode.

The power controller 523 carries out a control of shifting the power mode from a normal mode to the power-saving mode when a shift factor occurs, and returning the power mode from the power-saving mode to the normal mode when a return factor occurs.

The shift factor includes an end of access from the clients 3001 to 3003 to the personal computer 520. On the other hand, the return factor includes an access request from the clients 3001 to 3003 to the personal computer 520.

The main controller 522 controls each section of the personal computer 520. In this main controller 522, the CPU 522a controls switching and controls communications by executing various kinds of computer programs (operating systems, a starting program, application programs, etc.)

An application program 522b is executed on the CPU 522a, thereby to provide a special function. A standard IDE driver 522c is a driver for a hard disk interface installed as a standard on the personal computer 520. The standard IDE driver 522c controls access to the common HDD 540 via the IDE bus 527 and the switching section 517. The communication controller 522d controls communications with the communication controller 515e via the LAN 630.

When the personal computer 520 is in the normal power mode, the switching section 517 is switched to the personal computer 520. In this case, the CPU 522a accesses the common HDD 540 via the standard IDE driver 522c, the IDE bus 527, and the switching section 517.

In the normal power mode, the main controller 515 of the gateway card 510 accesses the common HDD 540 via the LAN 630, the communication controller 522d, the standard IDE driver 522c, the IDE bus 527, and the switching section 517. The cache memory 522e is provided corresponding to the communication controller 522d. The cache memory 515e is a memory to buffer a request queue (a command and data) at the time of accessing the common HDD 540 via the LAN 630 and the personal computer 520.

The memory 524 stores various kinds of data. An input section 525 includes a keyboard and a mouse, and is used to input various kinds of data. A display section 526 includes a CRT (Cathode Ray Tube) or an LCD (Liquid Crystal Display), and displays various screens and data under the control of the main controller 522.

The operation according to the first embodiment will be explained next with reference to FIG. 3 to FIG. 6. FIG. 3 is a flowchart that explains about the operation of the main controller 515 shown in FIG. 1. FIG. 4 is a flowchart that explains about the start processing shown in FIG. 3.

When the power supply of the gateway personal computer 500 is turned on, the power supply unit 530 supplies power to each section. As a result, at step SA1 shown in FIG. 3, the CPU 515a of the main controller 515 executes the start processing to start each section.

Specifically, at step SB1 shown in FIG. 4, the CPU 515a reads the kernel of the operating system from the memory 516. At step SB2, the CPU 515a executes the kernel, and starts the operating system.

At step SB3, the CPU 515a reads the starting file from the memory 516. At step SB4, the CPU 515a executes the starting file, and starts the networks (the LAN 630 and the LAN 400) and the DHCP. At step SB5, the CPU 515a initializes the pseudo IDE driver 515d.

At step SB6, the CPU 515a decides whether the power supply of the personal computer 520 is ON. In this case, the CPU 515a sets a result of the decision made as "Yes". At step SB7, the CPU 515a switches the switching section 517 to the personal computer 520.

At step SB8, the CPU 515a initializes the switching section 517 via the personal computer 520, that is, via the pseudo IDE driver 515d, the communication controller 515e, the LAN 630, the communication controller 522d, the standard IDE driver 522c, and the IDE bus 527.

At step SB9, the CPU 515a accesses the common HDD 540 via the pseudo IDE driver 515d, the communication controller 515e, the LAN 630, the communication controller 522d, the standard IDE driver 522c, and the IDE bus 527.

On the other hand, when a result of the decision made at step SB6 is "No", the CPU 515a switches the switching section 517 to the gateway card 510 at step SB10.

At step SB11, the CPU 515a directly initializes the switching section 517, that is, via the pseudo IDE driver 515d, the standard IDE driver 515c, and the IDE bus 518. At step SB12, the CPU 515a initializes the standard IDE driver 515c.

At step SB9, the CPU 515a accesses the common HDD 540 via the pseudo IDE driver 515d, the standard IDE driver 515c, the IDE bus 518, and the switching section 517.

Referring back to FIG. 3, at step SA2, the CPU 515a decides whether the personal computer 520 notifies about a shift from the normal power mode to the power-saving mode, and sets "No" as a result of the decision made in this case.

At step SA3, the CPU 515a decides whether the personal computer 520 notifies about a return from the power-saving mode to the normal power mode, and sets "No" as a result of the decision made in this case. Thereafter, the CPU 515a repeats making a decision at step SA2 and step SA3 respectively until when a result of the decision made at step SA2 or step SA3 becomes "Yes".

When the personal computer 520 notifies the gateway card 510 about a shift from the normal power mode to the power-saving mode, the CPU 515a sets "Yes" as a result of the decision made at step SA2.

At step SA4, the CPU 515a switches the switching section 517 to the gateway card 510 side. At step SA5, the pseudo IDE driver 515d switches the allocation destination of the access from the CPU 515a to the common HDD 540 to the standard IDE driver 515c.

When the gateway card 510 generates a request for access to the common HDD 540 (for example, a data writing), the CPU 515a accesses the common HDD 540 via the pseudo IDE driver 515d, the standard IDE driver 515c, the IDE bus 518, and the switching section 517, and writes the data into the common HDD 540.

When the personal computer 520 notifies the gateway card 510 about a return from the power-saving mode to the normal power mode, the CPU 515a sets "Yes" as a result of the decision made at step SA3.

At step SA6, the CPU 515a switches the switching section 517 to the personal computer 520 side. At step SA7, the pseudo IDE driver 515d switches the allocation destination of the access from the CPU 515a to the common HDD 540 to the communication controller 515e.

When the gateway card 510 generates a request for access to the common HDD 540 (for example, a data writing), the CPU 515a accesses the common HDD 540 via the pseudo IDE driver 515d, the communication controller 515e, the LAN 630, the communication controller 522d, the standard IDE driver 522c, the IDE bus 527, and the switching section 517, and writes the data into the common HDD 540.

Specifically, one access request consists of a plurality of request queues Q1 to Q3 shown in FIG. 5A. Each of the request queues Q1 to Q3 is a group of commands (write commands, etc.) and data.

When an access request occurs, the communication controller 515e receives the processing of the request queues Q1 to Q3 from the CPU 515a via the pseudo IDE driver 515d. The communication controller 515e sequentially stores, as shown in FIG. 5B, the request queues Q1 to Q3, starting from the request queue Q1, into the cache memory 515f.

After all the request queues Q1 to Q3 are stored into the cache memory 515f (refer to FIG. 5C), the communication controller 515e receives the processing of a plurality of request queues corresponding to the next access request in a similar manner to that shown in FIG. 5A. The communication controller 515e executes the communication processing and the access processing shown in FIG. 5D.

In other words, as shown in FIG. 5D, the communication controller 515e sequentially executes the request queues Q1 to Q3, and communicates with the communication controller 522d via the LAN 630.

The communication controller 522d temporarily stores data corresponding to the request queues Q1 to Q3 into the cache memory 522e. During this period, request queues corresponding to the next access request are stored into the cache memory 515f. The communication controller 522d receives these request queues via the LAN 630, and stores the request queues into the cache memory 522e.

The communication controller 522d delivers the data stored in the cache memory 522e into the standard IDE driver 522c independent of the communications via the LAN 630. As a result, the standard IDE driver 522c writes the data into the common HDD 540 via the IDE bus 527 and the switching section 517.

As explained above, the cache memory 515f and the cache memory 522e are provided in the gateway personal computer 500. With this arrangement, the communication processing between the gateway card 510 and the personal computer 520 and the access processing to the common HDD 540 can be executed in parallel and independently of each other, which improves performance.

When the cache memory 515f and the cache memory 522e are not provided, the communication processing and the access processing must be executed in series, which results in lower performances.

Figure 6A:
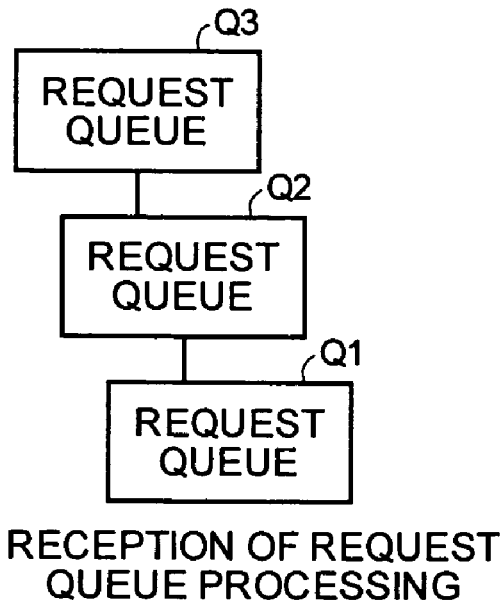
FIGS. 6A and 6B is to compare and explain about effects according to the first embodiment and the second embodiment.
Figure 6B:
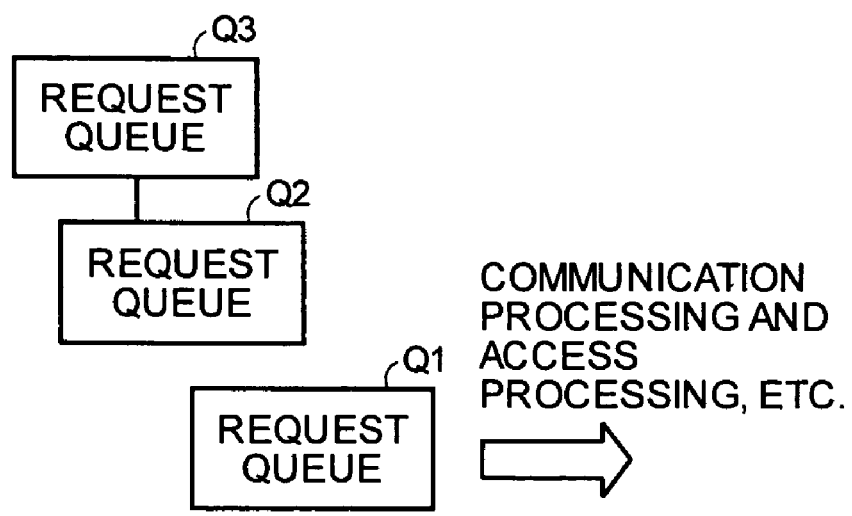

In other words, in the above case, when one access request occurs, the communication controller 515e receives the processing of the request queues Q1 to Q3 from the CPU 515a via the pseudo IDE driver 515d as shown in FIG. 6A. Next, the communication controller 515e sequentially executes the communication processing and the access processing concerning the request queues Q1 to Q3 respectively, starting from the request queue Q1, as shown in FIG. 6B.

The communication controller 515e does not receive the request queues concerning the next access request until when the communication processing and the access processing concerning all the request queues Q1 to Q3 end. Therefore, during the period while the processing of the next request queues is not received, time loss occurs and performance is lowered.

As explained above, according to the first embodiment, the personal computer 520 and the gateway card 510 share the common HDD 540. When the operation status of the personal computer 520 is in the normal power mode (the first operation status), the access to the common HDD 540 is allocated via the personal computer 520 and the switching section 517. The data communicated with the personal computer 520 is cached. The data communication processing and the access processing to the common HDD 540 are executed in parallel. Therefore, space saving and power saving can be achieved. At the same time, performance can be improved based on the parallel processing.

In the first embodiment, it is explained that the gateway card 510 accesses the common HDD 540 via the LAN 630 and the personal computer 520. In place of the personal computer 520, an NAS (Network Attached Storage) may be used. The NAS is a storage device of a format for directly connecting to the network, and is a file server.

FIG. 7 is a block diagram of a computer system according to a second embodiment of the present invention. This computer system includes a personal computer 600 and an NAS 700.

The personal computer 600 can access an NAS-side HDD 703 of the NAS 700 via a LAN 800. The personal computer 600 uses the NAS-side HDD 703 as if it is a local hard disk.

In the personal computer 600, a main controller 601 controls communications with the NAS 700, and controls access to a PC HDD 603 and the NAS-side HDD 703. In the main controller 601, a CPU 601a carries out access switching control and communication control according to the execution of various computer programs (operating systems, a starting program, application programs, etc.) The main controller 601 corresponds to the main controller 515 (refer to FIG. 1)

An application program 601b is a computer program that is executed by the CPU 601a, and that provides specific functions. A standard IDE driver 601c is a driver for a hard disk interface installed as a standard on the gateway card 600. The standard IDE driver 601c controls access to the PC-side HDD 603 via an IDE bus 602.

A pseudo IDE driver 601d has a driver function similar to the function of the standard IDE driver 601c, and a function of allocating access from the CPU 601a to the PC-side HDD 603 or the NAS-side HDD 703 to either the standard IDE driver 601d or a communication controller 601e.

Specifically, when the PC-side HDD 603 has sufficient idle capacity, the pseudo IDE driver 601d allocates the access from the CPU 601a to the standard IDE driver 601c. In this case, the CPU 601a accesses the PC-side HDD 603 via the pseudo IDE driver 601d, the standard IDE driver 601c, and the IDE bus 602.

On the other hand, when the PC-side HDD 603 has idle capacity in shortage, the pseudo IDE driver 601d allocates the access from the CPU 601a to the communication controller 601e. In this case, the CPU 601a accesses the NAS-side HDD 703 via the pseudo IDE driver 601d, the communication controller 601e, the LAN 800, a described later, a standard IDE driver 701c, and an IDE bus 702.

The communication controller 601e controls communications with the communication controller 701d via the LAN 800. The cache memory 601f is provided corresponding to the communication controller 601e. The cache memory 601e is a memory to buffer a request queue (a command and data) at the time of accessing the NAS-side HDD 703 via the LAN 800 and the NAS 700, in a similar manner to that of the cache memory 515f (refer to FIG. 1).

The IDE bus 602 connects between the standard IDE driver 601c and the PC-side HDD 603. The PC-side HDD 603 is a large-capacity memory that stores an operating system and various kinds of application programs that are used in the personal computer 600.

The NAS 700 is a file server (data memory) that is accessed by the personal computer 600 via the LAN 800. In the NAS 700, a main controller 701 controls each section of the NAS 700.

In the main controller 701, a CPU 701a controls switching and controls communications according to the execution of various computer programs (operating systems, a starting program, application programs, etc.)

An application program 701b is a computer program that is executed by the CPU 701a, and that provides specific functions. A standard IDE driver 701c is a driver for a hard disk interface installed as a standard on the gateway card 600. The standard IDE driver 701c controls access to the NAS-side HDD 703 via an IDE bus 702. The communication controller 701d controls communications with the communication controller 601e via the LAN 800.

The IDE bus 702 connects between the standard IDE driver 701c and the NAS-side HDD 703. The NAS-side HDD 703 is a large-capacity memory that stores an operating system and various kinds of application programs that are used in the NAS 700. When the PC-side HDD 603 has idle capacity in shortage, the NAS-side HDD 703 stores data of the personal computer 600.

The operation according to the second embodiment will be explained next with reference to FIG. 8. FIG. 8 is a flowchart that explains about the operation according to the second embodiment. At step SC1 shown in FIG. 8, the CPU 601a of the personal computer 600 decides whether a request to access the PC-side HDD 603 occurs. In this case, a result of a decision made is set to "No", and a decision is repeated.

When a request for access to the PC-side HDD 603 (for example, a data writing) occurs, the CPU 601a sets "Yes" as a result of the decision made at step SC1. At step SC2, the CPU 601a checks idle capacity data in the PC-side HDD 603 that is stored in a memory (not shown) in advance, and decides whether the idle capacity is in shortage.

When the PC-side HDD 603 has sufficient idle capacity (equal to or more than a threshold value), the CPU 601a sets "No" as a result of the decision made at step SC2. At step SC5, the pseudo IDE driver 601d switches the allocation destination of the access from the CPU 601a to the standard IDE driver 601c.

At step SC4, the CPU 601a accesses the PC-side HDD 603 via the pseudo IDE driver 601d, the standard IDE driver 601c, and the IDE bus 602, and writes data.

On the other hand, when the PC-side HDD 603 has idle capacity in shortage (less than the threshold value), the CPU 601a sets "Yes" as a result of the decision made at step SC2. At step SC3, the pseudo IDE driver 601d switches the allocation destination of the access from the CPU 601a to the communication controller 601e.

At step SC4, the CPU 601a accesses the NAS-side HDD 703 via the pseudo IDE driver 601d, the communication controller 601e, the LAN 800, the communication controller 701d, the standard IDE driver 701c, and the IDE bus 702, and writes the data.

Specifically, when an access request occurs, the communication controller 601e receives the processing of the request queues Q1 to Q3 (refer to FIG. 5A) from the CPU 601a via the pseudo IDE driver 601d. Next, the communication controller 601e sequentially stores the request queues Q1 to Q3, starting from the request queue Q1, into the cache memory 601f (refer to FIG. 7), as shown in FIG. 5B.

After all the request queues Q1 to Q3 are stored into the cache memory 601f, the communication controller 601e receives the processing of a plurality of request queues corresponding to the next access request in a similar manner to that shown in FIG. 5A. The communication controller 601e executes the communication processing and the access processing shown in FIG. 5D.

In other words, as shown in FIG. 5D, the communication controller 601e sequentially executes the request queues Q1 to Q3, and communicates with the communication controller 701d via the LAN 800.

The communication controller 701d temporarily stores data corresponding to the request queues Q1 to Q3 into the cache memory 701e. During this period, request queues corresponding to the next access request are stored into the cache memory 601f. The communication controller 701d receives these request queues via the LAN 800, and stores the request queues into the cache memory 701e.

The communication controller 701d delivers the data stored in the cache memory 701e into the standard IDE driver 701c independent of the communications via the LAN 800. As a result, the standard IDE driver 701c writes the data into the common NAS-side HDD 703 via the IDE bus 702.

As explained above, the cache memory 601f and the cache memory 701e are provided in the personal computer 600 and the NAS 700. With this arrangement, like in the first embodiment, the communication processing between the personal computer 600 and the NAS 700 and the access processing to the NAS-side HDD 703 can be executed in parallel and independently of each other, which improves performance.

As explained above, according to the second embodiment, when the idle capacity at the PC-side HDD 603 is equal to or higher than the threshold value (sufficient), the access is allocated to the PC-side HDD 603. When the idle capacity at the PC-side HDD 603 is less than the threshold value (in shortage), the access is allocated to the NAS 700 (NAS-side HDD 703). The data communicated with the NAS 700 is cached. The data communication processing and the access processing to the NAS-side HDD 703 are executed in parallel. Therefore, performance can be improved based on the parallel processing.

In the second embodiment, it is explained that when the idle capacity of the PC-side HDD 603 is in shortage, access is made to the NAS-side HDD 703. Alternatively, it is also possible to arrange as follows. The pseudo IDE driver 601d decides a kind of access request (i.e., access to the PC-side HDD 603 or access to the NAS-side HDD 703). When a request for access to the PC-side HDD 603 occurs, the access is allocated to the PC-side HDD 603, and when a request for access to the NAS-side HDD 703 occurs, the access is allocated to the NAS-side HDD 703.

According to this configuration, when a request for access to the PC-side HDD 603 occurs, the access is allocated to the PC-side HDD 603, and when a request for access to the NAS-side HDD 703 occurs, the access is allocated to the NAS 700 (the NAS-side HDD 703). The data communicated with the NAS 700 is cached. The data communication processing and the access processing to the NAS-side HDD 703 are executed in parallel. Therefore, performance can be improved based on the parallel processing.

For example, in the first and the second embodiments, the following modification may be made. A computer program that realizes the functions of the gateway personal computer 500 (the gateway card 510, and the personal computer 520) shown in FIG. 1 and the personal computer 600 and the NAS 700 shown in FIG. 7 is recorded onto a computer-readable recording medium 900 shown in FIG. 9. A computer 800 shown in FIG. 7 reads and executes the computer program recorded on this recording medium 900, thereby to realize the functions.

Figure 9:
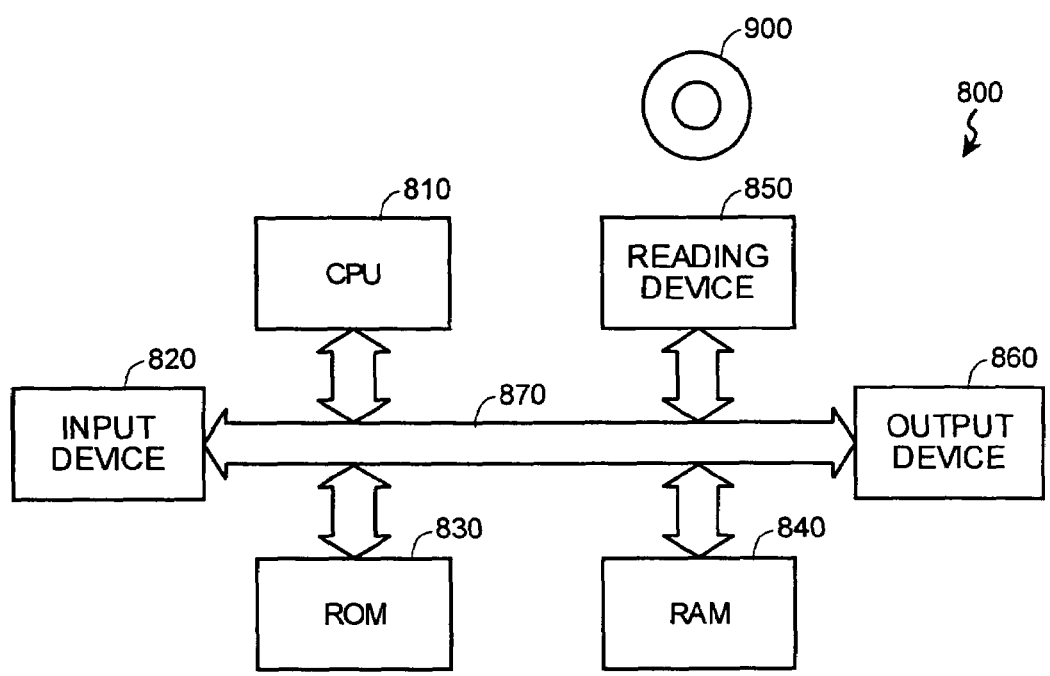
FIG. 9 is a block diagram of a modification of the first embodiment and the second embodiment.

The computer 800 shown in FIG. 9 comprises a CPU 810 that executes the computer program, an input device 820 including a keyboard and a mouse, a ROM (Read Only Memory) 830 that stores various kinds of data, a RAM (Random Access Memory) 840 that stores operation parameters, a reading device 850 that reads the computer program from the recording medium 900, an output device 860 including a display and a printer, and a bus 870 that connects between sections of the devices.

The CPU 810 reads the computer program recorded on the recording medium 900 via the reading device 850, and executes the computer program, thereby to realize the above functions. For the recording medium 900, an optical disk, a flexible disk, and a hard disk are available.

As explained above, according to the present invention, the information communication processing and the access processing can be executed in parallel, thereby to improve performance.

Moreover, as the data memory can be used as a local memory, thereby performance is improved.

Furthermore, energy saving can be achieved, and that performance can be improved by executing the information communication processing and the access processing to the storage unit in parallel.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An access control system comprising:
a first information processing apparatus connected to a first storing unit; and
a second information processing apparatus connected to the first storing unit, wherein
the first information processing apparatus includes:
an access control unit that allocates an access request to either one of a first access not passing through the second information processing apparatus to the first storing unit and a second access passing through the second information processing apparatus to the first storing unit, according to power mode of the second information processing apparatus;
a first cache unit that temporarily stores the access request allocated to the second access; and
a communication control unit that controls communication with the second information processing apparatus to transmit the access request stored in the first cache unit sequentially to the second information processing apparatus, and the second information processing apparatus includes:
a second cache unit that temporarily stores the access request transmitted by the communication control unit; and
a control unit that controls access to the first storing unit according to the access request stored in the second cache unit in parallel with receiving new access request from the communication control unit.

2. The access control system according to claim 1, wherein the access control unit allocates the access request to the first access when the second information processing apparatus is in a power-saving mode, while allocates the access request to the second access when the second information processing apparatus is in a normal power mode.

3. The access control system according to claim 1, further comprising a switching unit that is provided between the first storing unit and both the first information processing apparatus and the second information processing apparatus, and connects the first storing unit and either one of the first and second information processing apparatus, wherein
the access control unit allocates the access request to the second access, when the first storing unit is connected to the second information processing apparatus by the switching unit.

4. A gateway card that is connected to an information processor and that allows transfer of data between different networks, comprising:
a switching unit that switches a connection between a storing unit and either one of the gateway card and the information processor;
an access control unit that allocates an access request to either one of a first access not passing through the information processor to the storing unit and a second access passing through the information processor to the storing unit based on the connection switched by the switching unit;
a cache unit that temporarily stores the access request allocated to the second access; and
a communication control unit that controls communication with the information processor to transmit the access request stored in the cache unit sequentially to the information processor.

5. A computer-readable storage medium that stores a computer program executed on an access control system having a first information processing apparatus connected to a first storing unit and a second information processing apparatus connected to the first storing unit, wherein
the execution of the computer program making the first information processing apparatus perform:
allocating an access request to either one of a first access not passing through the second information processing apparatus to the first storing unit and a second access passing through the second information processing apparatus to the first storing unit, according to power mode of the second information processing apparatus;
temporarily storing the access request allocated to the second access in a first cache memory; and
controlling communication with the second information processing apparatus to transmit the access request stored in the first cache memory sequentially to the second information processing apparatus, and the execution of the computer program making the second information processing apparatus perform:
temporarily storing the access request transmitted from the first information processing apparatus in a second cache memory; and
controlling access to the first storing unit according to the access request stored in the second cache memory in parallel with receiving new access request from the first information processing apparatus.

6. An access control method used in an access control system having a first information processing apparatus connected to a first storing unit and a second information processing apparatus connected to the first storing unit, the information processing method comprising steps executed by the first information processing apparatus of:
allocating an access request to either one of a first access not passing through the second information processing apparatus to the first storing unit and a second access passing through the second information processing apparatus to the first storing unit, according to power mode of the second information processing apparatus;
temporarily storing the access request allocated to the second access in a first cache memory; and
controlling communication with the second information processing apparatus to transmit the access request stored in the first cache memory sequentially to the second information processing apparatus, and
steps executed by the second information processing apparatus of:
temporarily storing the access request transmitted from the first information processing apparatus in a second cache memory; and
controlling access to the first storing unit according to the access request stored in the second cache memory in parallel with receiving new access request from the first information processing apparatus.

7. An access control system comprising:
a first information processing apparatus connected to a first storing unit; and
a second information processing apparatus connected to a second storing unit, wherein
the first information processing apparatus includes:
an access control unit that allocates an access request to either one of a first access to the first storing unit and a second access passing through the second information processing apparatus to the second storing unit, according to idle capacity of the first storing unit;
a first cache unit that temporarily stores the access request allocated to the second access; and
a communication control unit that controls communication with the second information processing apparatus to transmit the access request stored in the first cache unit sequentially to the second information processing apparatus, and
the second information processing apparatus includes:
a second cache unit that temporarily stores the access request transmitted by the communication control unit; and
a control unit that controls access to the second storing unit according to the access request stored in the second cache unit in parallel with receiving new access request from the communication control unit.

8. The access control system according to claim 7, wherein the access control unit allocates the access request to the second access, when an idle capacity of the first storing unit is less than a predetermined threshold value.

* * * * *